Nov. 13, 1928.　　　　　　　　　　　　　　　　　　　1,691,119
W. J. MILLER
MOLD LOADING AND TRANSFERRING MACHINE AND JIGGER COMBINED
Filed Nov. 26, 1926　　　3 Sheets-Sheet 1

Fig. 1

INVENTOR
William J. Miller
BY Israel Benjamin.
ATTORNEY

Patented Nov. 13, 1928.

1,691,119

UNITED STATES PATENT OFFICE.

WILLIAM J. MILLER, OF SWISSVALE, PENNSYLVANIA.

MOLD LOADING AND TRANSFERRING MACHINE AND JIGGER COMBINED.

Application filed November 26, 1926. Serial No. 150,809.

My invention relates to improvements in the art and the manufacture of articles from plastic materials, and it consists in the novel features, which are hereinafter described.

One of the objects of my improvement is to produce a machine for automatically bringing molds with material thereon loaded on suitable trucks or carriers to the jigger and transfer them from the jigger to trucks to be carried to the dryer.

Another object of my improvement is to save time and labor in operating my above mentioned machine.

A further object of my improvement is to operate my machine with multiple vertically arranged tiers of molds, to be carried to and from the jigger, whereby the operation of drying is facilitated, and time and labor saved.

Another object of my improvement is to produce a perfected mold loading and transferring machine adapted to operate on multiple jiggers, as described in my copending application, filed Nov. 17, 1926, Serial No. 148,872.

A still other object of my invention is to have my mold loading and transferring machine and jigger combined simple, durable and inexpensive.

Other objects and advantages will hereinafter appear.

I attain these objects by the mechanism, illustrated in the accompanying drawings, or by any mechanical equivalent or obvious modification of the same.

In the drawings

Like numerals refer to like parts throughout the several views.

11 designates a stationary base or frame, which is shown as having vertical columns 12 secured thereto by means of nuts 13 and 14 in engagement with threaded portions 15 at the ends of said columns 12.

Figure 1:
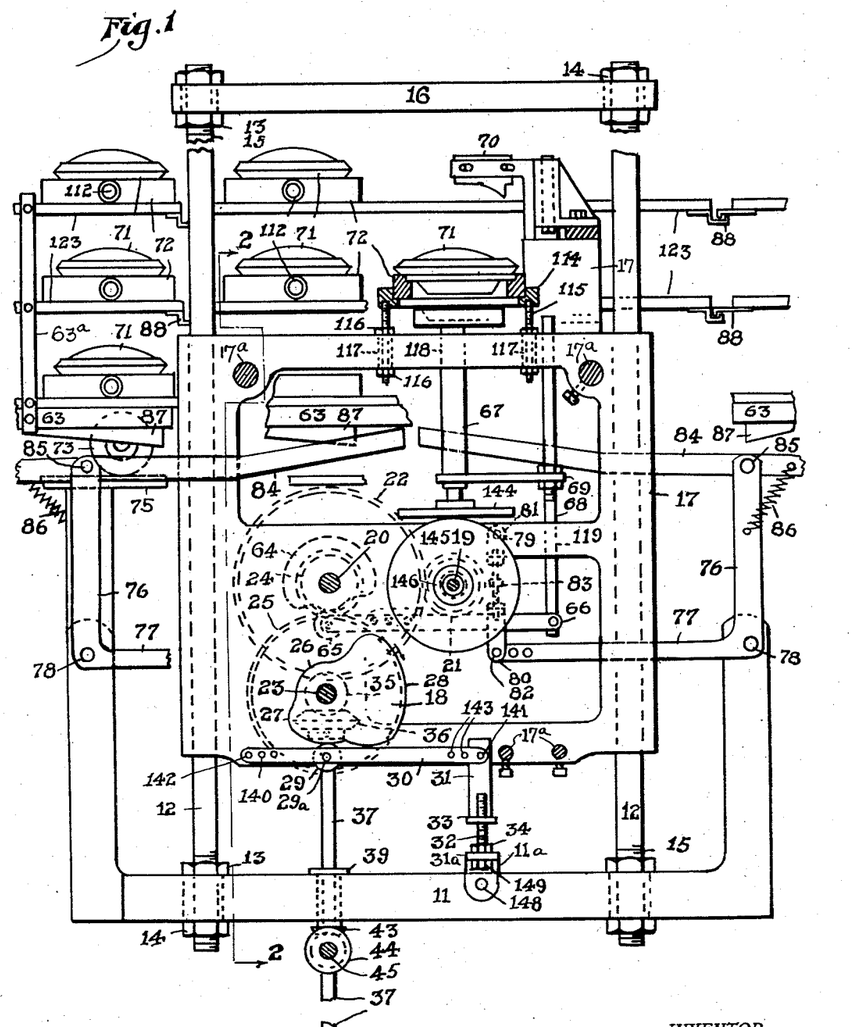
Fig. 1 is a vertical section on the line 1—1 of Fig. 2 omitting the face cam, which is hereinafter described.

The upper ends of said columns 12 are shown in Fig. 1 as connected by beams 16.

A movable frame 17 is shown as slidably connected to said columns 12, and the vertical position of said frame 17 is controlled by one or more cams 18, mounted thereon, which are hereinafter more fully described. When a multiple of frames and units are employed, they may be connected by adjustable cross supports 17$^a$, Fig. 1.

A power shaft 19 is shown as mounted on said frame 17, and may be actuated either by a motor or by suitable belt or rope gearing, which is not shown in the drawings.

A countershaft 20 is also shown as mounted on said frame 17, and is shown as operatively connected to said shaft 19 by means of a pair of spur gears 21 and 22.

The shafts 19 and 20 may be secured against longitudinal displacement by any suitable means either standard or special.

Any other transmission gears or means may be employed instead of said gears 21 and 22, if desired.

A shaft 23 is shown as mounted on said frame 17 below said shaft 20, and is shown as operatively connected thereto by means of a pair of spur gears 24 and 25.

The shaft 23 has mounted thereon said cam or cams 18, which may be adjustably secured thereto by means of hubs 124 on said cams 18 and screws 125.

Said cams 18 have thereon multiple dwell surfaces 26, 27 and 28, as shown in Fig. 1, which act on rolls 29, which are pivotally connected by means of pins 29$^a$ to levers 30, which are in turn pivotally connected by means of a shiftable pin at 140 to said frame 17, and by means of a shiftable pin at 141 to oscillating brackets 31, which are adjustably secured by means of threaded flanges 33 on said brackets 31 to screws 32, which are in engagement with flanges 31$^a$ of lugs 11$^a$, which are pivotally connected to said frame 11 by means of pins 148. The levers 30 with the brackets 31 and screws 32 form irregular toggle joints. Sets of multiple openings 142 and 143 are provided in said lever 30, for interchangeably connecting the same to said pins 140 and 141 respectively, thereby varying the distance from said pins 140 and 141 to the point of contact of said cam 18 and said lever 30, and thereby varying the rise of said frame 17 with relation to said frame 11.

The frame 17 has also therein multiple openings situated opposite said openings 142, for interchangeably connecting said pins 140 to said frame 17.

The stroke of said frame 17 may be varied and adjusted either by adjusting the position of said bracket 31 and flange 33 with relation to said screw 32 by turning said screw by means of the head 149 thereon, or by interchanging the pins 140 and 141 in said sets of multiple openings 142 and 143 in said lever 30, or by both of these adjustments, if desired.

Nuts or collars 34 keep said screws 32 from being longitudinally displaced on said lug 11ª.

It is evident that during each revolution of said cam or cams 18, the slidable frame 17 will be raised thereby on said columns 12 from its original level to two successively higher levels, and be kept on each of them as long as the corresponding dwell surfaces 27 and 28 are each in contact with said rolls 29, and then the frame 17 will be lowered at once by gravity to its original level when the dwell surfaces 26 will come into contact with said rolls 29. It is obvious that the frame 17 could be adapted to support mechanism other than jiggering mechanism for performing any desired fabricating operation without departing from the scope of the invention.

Figure 2:
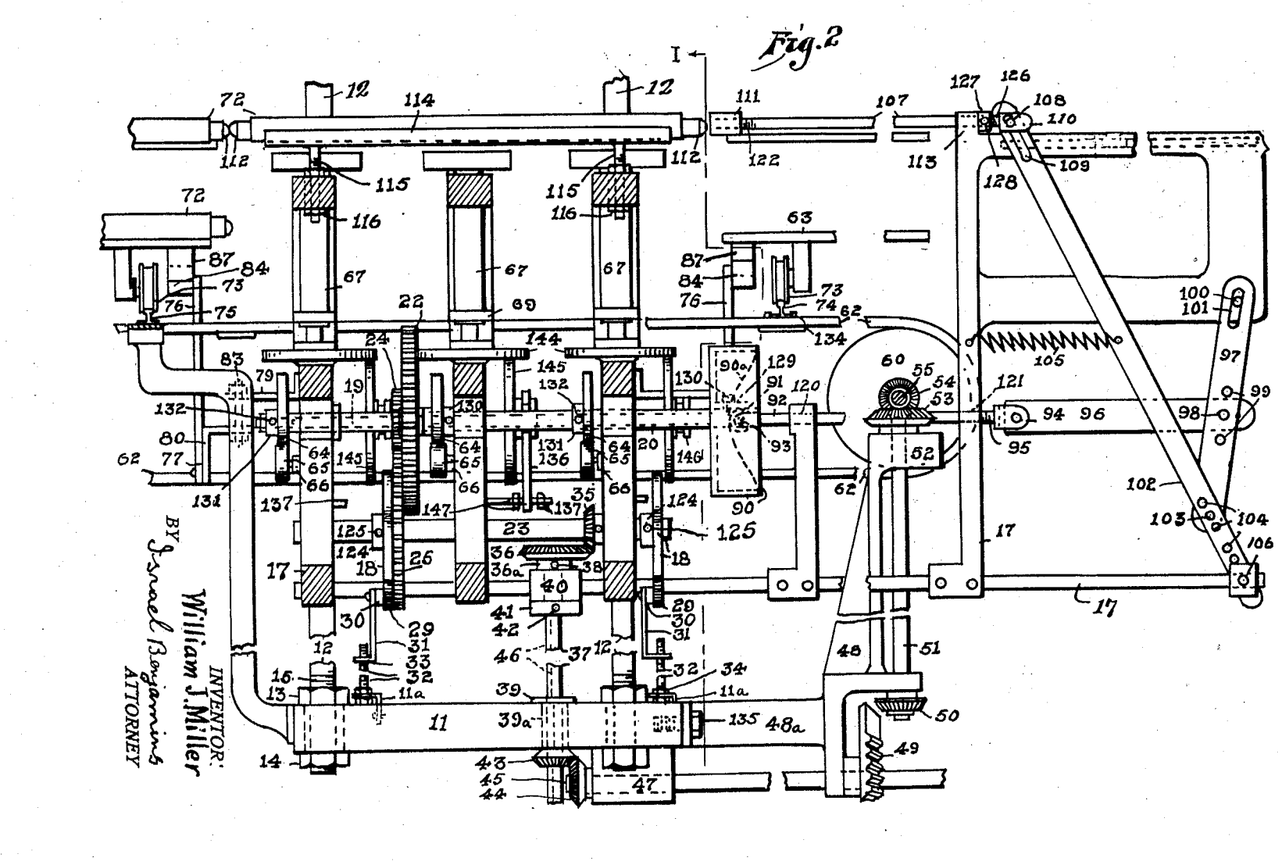
Fig. 2 is a front elevation, partly in section, on the line 2—2 of Fig. 1, of my mold loading and transferring machine and jigger combined, showing the middle part of the machine and the left hand end thereof as broken away.

The shaft 23 has also mounted thereon a bevel gear 35 which is in mesh with another bevel gear 36, having thereon a hub 36ª, which is shown as secured to the upper end of a vertical spindle 37 by means of a suitable fastening 38, which is shown in Fig. 2 of the drawings.

The gear 36 is kept in mesh with said gear 35 by means of said spindle 37, which is revolvably mounted on said frame 17 by means of a thrust bearing 40 on said frame 17, and both slidably and revolvably connected to said frame 11 by means of a revolving sleeve 39ª, which has therein a spline, to fit a keyway 46 in said spindle 37.

A collar 39 on said sleeve or bearing 39ª keeps the latter from longitudinal displacement on said frame 11.

The spindle 37 is kept from longitudinal displacement with relation to said frame 17 by means of a collar 41 thereon, which is shown in Fig. 2, and said hub 36ª, resting on said thrust bearing 40; the collar 41 may be secured to said spindle 37 by means of a screw 42, as shown in Fig. 2.

A bevel gear 43 is secured to the lower end of said sleeve 39ª, and is also slidably mounted on said spindle 37 under said frame 11 by means of said spline in said sleeve 39ª, which is not shown in the drawings, and said keyway 46 in said spindle 37, which is shown in Fig. 2, to revolve with said spindle 37 in mesh with a bevel gear 44, which is shown in Fig. 2 as mounted at the end of a horizontal shaft 45, which is supported in position by a bearing block 47, which may be secured to the underside of said frame 11, and a stationary bracket 48, which is shown in Fig. 2 as secured to said frame 11, by means of a screw 135, and an extension 48ª on said bracket 48.

The shaft 45 has also mounted thereon an intermittent bevel gear 49, which is intermittently in mesh with a bevel gear 50, which is secured to the lower end of a vertical spindle 51; the latter is revolvably connected at the lower end thereof to a horizontal flange of said bracket 48 and at the upper end thereof to a bracket 52, which is stationary with relation to said bracket 48 and said frame 11.

The intermittent gear 49 serves to synchronize the operation of jiggers 67, which are hereinafter described, with the motion of a traverse conveyor 62—62, which is hereinafter described.

Figure 3:
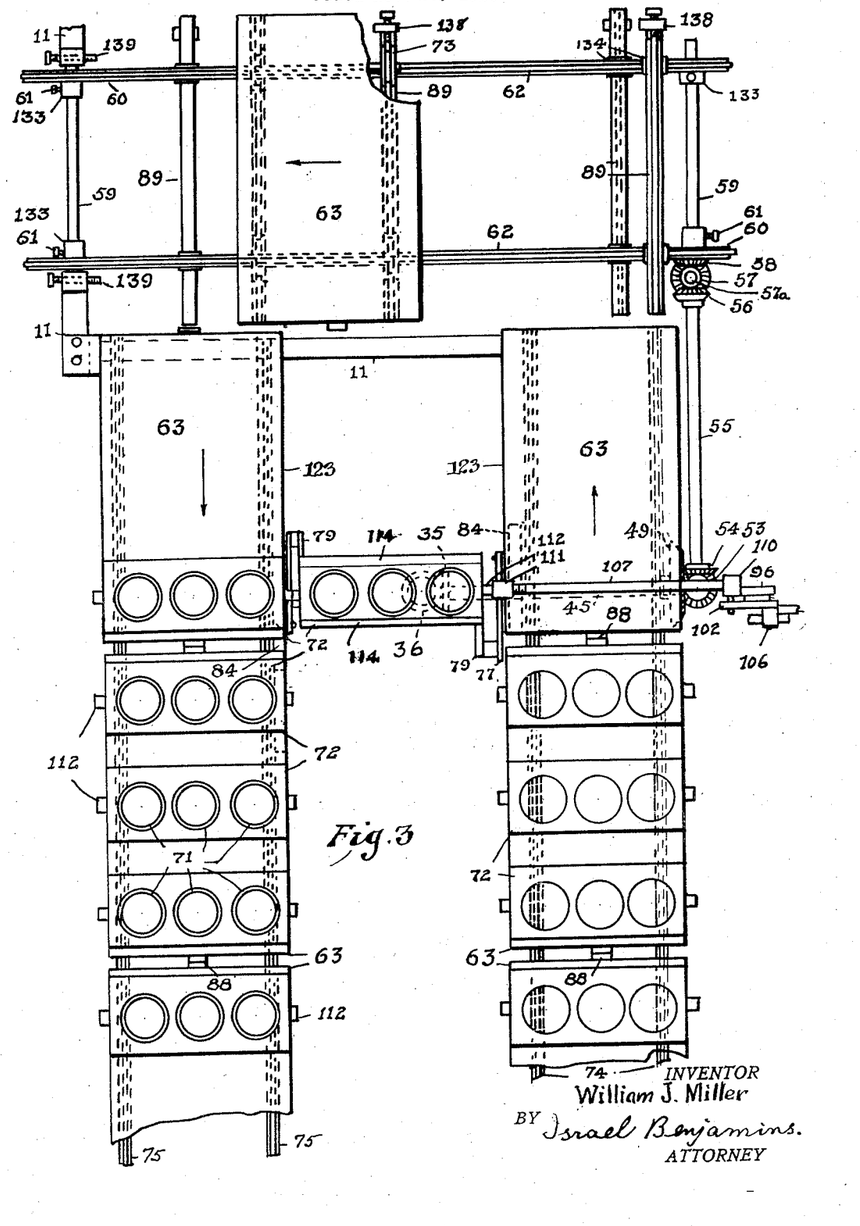
Fig. 3 is a diagrammatical top plan view of my mold loading and transferring machine and jigger combined, illustrating the direction and mode of travel of mold racks and trucks, which are hereinafter described, to and from the jiggers.

The spindle 51 has secured thereto at the upper end hereof a bevel gear 53, which is shown in Figs. 2 and 3 of the drawings as being in mesh with a bevel gear 54, which is shown as secured to one end of a horizontal shaft 55, which has secured thereto at the other end thereof a bevel gear 56, which is shown in Fig. 3 in mesh with a horizontal bevel gear 57 on a jack shaft 57ª. The gear 57 is shown in Fig. 3 as being in mesh with a bevel gear 58, which is secured to one end of one of a pair of horizontal conveyor spindles 59, which have each adjustably secured thereto a pair of wheels or sprockets 60 by means of set screws 61 and hubs 133 on said wheels 60.

Endless flexible members 62, which may be either chains, belts or ropes, are in engagement with said wheels or sprockets 60, as shown in Fig. 3, and form therewith a traverse conveyor; they have secured thereon, transversely thereto, sectional tracks 89, for intermittently transferring carriers or trucks 63 at the rear of my mold loading and transferring machine, transversely to the latter, for a purpose which is hereinafter described.

Stops 138 are provided at the ends of said sectional tracks 89 for the wheels 73 of said trucks 63, to prevent the overrunning of the latter by momentum, in a direction lengthwise to said tracks 89.

Screws 139 are also provided in said frame 11 at the left end of said traverse conveyor 62—62 in Fig. 3, to act as stops for said trucks 63, to prevent their overrunning by momentum.

Said shaft 20 on said frame 17 has mounted thereon multiple cams 64 in contact with rolls 65, which are pivotally connected to the ends of levers 66, which are pivoted on said frame 17, for actuating jigger spindles 67 by means of pitmen 68 and forks 69;

Horizontally disposed friction gears 144 are slidably connected to said spindles 67 to rotate the same and to allow the reciprocation of the latter without reciprocating themselves.

Vertically disposed friction gears 145 are slidably mounted on said shaft 19 to engage said gears 144, to impart motion thereto, thereby actuating said spindles 67.

A sleeve 146 on each of said gears 145 is revolvably connected to one end of a fork or collar 136; the other end of said fork 136 is adjustably connected to said frame 17 by means of a screw 137, which serves to control the position of said gear 145 on said shaft 19, whereby the speed of each jigger may be varied independently of the speed of the other jiggers.

The position of said fork 136 together with the position of said gear 145 is adjusted and controlled by means of nuts 147 on said screws 137. Otherwise the operation of the jigger is as described in my copending applications for patents filed Oct. 25, 1926, and Nov. 17, 1926, Serial Nos. 143,994 and 148,872 respectively. The cams 64 may be adjustably secured to said shafts 20 by means of hubs 131 thereon and screws 132.

The frame 17 carries the jigger spindles 67 and pitmen 68 in its vertical travels under the influence of said cams 18.

The spindles 67 and pitmen 68 are also slidably connected at 118 and 119 respectively to said frame 17, which has also profiles 70 secured thereto, to be raised and lowered therewith as described in my second copending application, for successively shaping the material on molds 71, which are carried by horizontally disposed mold racks 72, which are arranged in three vertical tiers, one above the other, on shelves 123 supported by uprights 63ª, Fig. 1, on said carriers or trucks 63, which are mounted on wheels 73, to roll on tracks 74 and 75, which are supported by said frame 11.

Besides being raised by the pitmen 68 with relation to the frame 17, the jiggers 67 and profiles 70 are also raised by the frame 17, to act successively on each tier of molds 71 on each truck 63, preferably starting with the lower tier and ending with the upper tier, and are then lowered again to act on tiers of another truck, which is brought into position on said track 74, as is hereinafter described.

The action of said profiles 70, pitmen 68, levers 66 and jiggers 67 on the molds of each tier is substantially as described in the second named of my above copending applications, and their motion with relation to said frame 17 is independent of their motion with said frame 17 as raised by said cams 18.

A pair of oppositely placed bell crank levers 76—77 is shown in Fig. 1 as pivotally connected to the frame 11 at the sides thereof, by means of pins at 78.

A pair of vertically disposed floating links or brackets 79 and 80 are shown in Fig. 1 as pivotally connected respectively to said frame 17 at 81 and to the horizontal arm 77 of one of said levers 76—77 at 82.

A turnbuckle 83 is shown in engagement at the ends thereof with internally threaded horizontal flanges on said brackets 79 and 80, for adjusting the relative position of said levers 76—77 with relation to said frame 17. The other of said levers 76—77 is provided with a similar adjusting means.

By means of said floating links or brackets 79 and 80 the arm 77 of each of said levers 76—77 is gradually raised as said frame 17 with the jiggers thereon is gradually raised by said cam 18, as is hereinbefore described and then lowered at once to its original position, thereby imparting a corresponding intermittent oscillating motion to the vertical arm 76 of each of said levers 76—77.

A pawl 84 is shown in Fig. 1 as pivotally connected to each of said arms 76 at the upper end of the latter by means of a pin 85. A tensile spring 86 is shown as connected at one end thereof to said arm 76 and at the other end thereof to a rearward extension of said pawl 84, to keep said pawl in engagement with racks 87 at the underside of said carriers or trucks 63, whereby said trucks 63 are intermittently moved rearwardly on said tracks 74 and forwardly on said tracks 75 by said pawls 84 each time when said frame 17 is lowered, and are kept stationary while said frame 17 is being raised.

The wheels 73 of said trucks 63 roll on said tracks 74 and 75, which are situated on each side of said jigger 67, as shown in Figs. 2 and 3, and in opposite directions.

When the trucks 63 on the track 74 reach the traverse conveyor 62—62, the wheels 73 at the underside of said trucks 63 roll on to the sectional track 89, which is secured by means of clamps 134 to the flexible members 62 of said conveyor 62—62, as shown in Fig. 3 and carried to the left in Fig. 3, until the wheels 73 under said trucks 63 are opposite the track 75, when said wheels 73 are allowed by said sectional track 89 on said conveyor 62—62 to roll on to the track 75, under the influence of traverse loose couplings 88, at the junctions of said trucks 63, which couplings are hereinafter described.

The motion of said conveyor 62—62 is synchronized with the operation of said jiggers 67 by means of said intermittent bevel gear 49, in the train of gears, which is operatively connecting said conveyor 62—62 to said jiggers 67; and the motion of said carriers 63, and pawls 84 may be synchronized with the above operation by means of the turnbuckles 83, which are hereinbefore described, and by means of said screws 32, which are hereinbefore described.

The traverse loose couplings 88 are so designed as to allow said trucks 63 to be disengaged from each other in a direction transversely to said tracks 74 and 75, but to be coupled to each other in a direction parallel to said tracks 74 and 75.

The shaft 20 has also mounted thereon a face cam 90, which may be adjustably secured thereto by means of a hub 129 and a screw 130, to act on a roll 91, which is pivotally connected to one end of a guide rod 92 by means of a pin 93. The roll 91 is shown in Fig. 2 as being in contact with the rear edge 90ᵃ of said cam 90.

The said rod 92 is slidably connected to said frame 17 at 120 and 121, and has adjustably connected thereto at the other end thereof a bifurcated or coupling member 94 by means of a screw thread 95 thereon.

The bifurcated member 94 is pivotally connected to one end of a coupling bar 96, which is pivotally connected at the other end thereof to an oscillating lever 97 by means of a shiftable pin 98 thereon, which may be interchangeably connected to any one of multiple openings 99 in said lever 97, thereby varying and adjusting the angle of oscillation of said lever 97 about a pin 100 on said frame 17 as an axis.

Said lever 97 has therein a slot 101 at the inner end thereof, to form both a slidable and a pivotal connection with the pin 100, said lever 97 being pivotally connected at the outer end thereof by means of a pin 103 to a rocker arm 102, to rock the latter about a pin 106 on said frame 17 as an axis.

The pin 103 may be interchangeably connected to any one of multiple openings 104 in said arm 102, whereby the angle of oscillation of said arm 102 about said pin 106 may be varied and adjusted.

A tensile spring 105 is shown as connected at one end thereof to said frame 17 and at the other end thereof to said arm 102, to keep said roll 91 in contact with said face cam 90 and to turn said arm 102, from right to left in Fig. 2, to return it to its original position each time after said arm 102 is turned from left to right in Fig 2, by said cam 90, said rod 92 and said bar 96 and lever 97.

The arm 102 is shown in Fig. 2 as both pivotally and slidably connected at the upper end thereof to a push rod 107 by means of a pin 108 on a block 110 at the outer end of said rod 107 and slot 109 in said arm 102. The block 110 may be adjustably secured to said rod 107 by means of a screw thread 126 at the end of said rod 107, which is shown in Fig. 2 as slidably connected to said frame 17 at 113, a collar 127 adjustable by screw 128 being provided on said rod 107 to limit its sliding movement.

The other end of said rod 107 has adjustably secured thereto by means of a screw thread 122 thereon a push block 111, to act on a buffer 112, which is provided at each side of said mold racks 72, repeatedly to move new racks 72 from the shelves 123 of said trucks 63 on to a horizontal support or frame 114, which is mounted on said frame 17 over the jiggers of the machine, thereby also removing old racks 72 from said support or frame 114, after the material, carried by the molds thereon, has been shaped by the jiggers of the machine, to make room for said new racks, which may be either located on higher shelves 123 on the same trucks 63, as the jiggers are being raised to the next higher position, or each of said new racks may be one of a lower tier, brought along by another truck 63 on the track 74; the new mold racks are also to remain in position on the support or frame 114 over the jiggers of the machine until the operation of shaping the material, carried by the molds thereon, is completed.

The action of the push rod 107 and the push block 111 thereon may be synchronized with the operation of said jiggers 67 by means of said screw threads 95, 126 and 122 and by means of said shiftable pins 98 and 103, also by the adjusting screw 130 and the hub 129 on said cam 90.

The frame 114 is adjustably mounted on said frame 17 by means of stud bolts 115, nuts 116 and enlarged openings 117 in said frame 17, for said stud bolts 115 to pass therethrough. Said openings 117 allow the horizontal adjustment of said frame 114 on said frame 17. More than one support or frame 114 may be used in my mold loading and transferring machine, if desired.

The phases of motion of the moving parts of my mold loading and transferring machine and jigger combined are controlled by said cams 18, 64 and 90, and they may be adjusted and varied with relation to each other as is hereinbefore described.

The number of racks 72 on each truck 63 may be increased or diminished, and the cams 18 may be given a corresponding number of dwell surfaces for acting on all of said racks in succession, if desired. The number of racks on said frame 114 may also be increased, and said support or frame 114 may be extended to receive said additional racks and for other purposes, if desired. The frames 11 and 17 and the conveyor 62—62 with the parts supported thereby may then be extended also, to correspond to the said extension of said support or frame 114, if desired, to make room for any additional mechanisms, such as clay feeding devices and the like.

The cams 18 may be positioned on the stationary frame 11 and the roll 29 on the movable frame 17, if desired.

Other means than cams may also be employed for raising the frame 17.

The jigger frame 17 may also be stationary and the trucks 63 with the mold racks 72 thereon vertically movable, if desired.

The jiggers 67 may also be used without the frame 17, and the cams 64, operating the jiggers may be designed to give the necessary variable lift to the spindles 67 to reach the racks 72 on various levels, if desired.

The frame 17 with the jiggers 67 thereon, or the latter without the frame 17, may also be moved horizontally, to act on racks kept stationary, if desired.

The trucks 63 with the frame 17 may also be raised by the cams 18 to feed the racks 72 to jiggers mounted on the frame 11, if desired.

Fig. 3 illustrates the movement of the trucks 63 with their shelves or tiers 123 for carrying the mold racks 72. In Fig. 1 the truck 63 shown at the left is on the far side of the jiggering mechanism on tracks 75 while the fragmentary part of the truck 63 shown at the right of Fig. 1 is on the tracks 74 (not shown in Fig. 1) on the near side of said mechanism, as may be understood by referring to Fig. 3, and the pawl 84 at the left of Fig. 1 acts on the trucks on tracks 74 while the pawl 84 at the right acts on the trucks on tracks 75. The trucks are shown in Fig. 3 as moving in the direction of the arrow on tracks 74 at the right of Fig. 3 bearing empty racks 72, but it will be understood that in practice the racks would be supplied with molds which may bear charges of plastic material ready to be jiggered or acted on by the jiggering mechanism, which may be disposed in operative position between the tracks 74 and 75 under the rack 72 shown in Fig. 3 between said tracks and which rack is being supported on the supports 114 forming part of the frame 17 and shown at the upper part of Fig. 2. The molds may be supplied or fed with charges of plastic material either manually or automatically, the present invention not being concerned with this phase of the fabricating operation. However, it will be obvious that suitable feeding mechanism could be disposed in position to feed the molds prior to being acted on by the jiggering mechanism by spacing the tracks 74 and 75 further apart and extending the supports 114 as heretofore noted to the right in Fig. 3 to accommodate one or more additional racks.

For an example of operation, let it be assumed that a loaded truck is in position in rear of the empty truck opposite the jiggering mechanism on tracks 74 with its mold racks 72 bearing molds which have been fed with charges of plastic material to be formed or jiggered, and that the face cam 90 has operated to permit a stroke of the rocker arm 102 and push rod 107 to slide the last topmost rack off of the top shelf 123 of the truck immediately opposite the jiggering mechanism onto the supports 114 of the frame 17 with the trucks and trays in position substantially as is shown in plan view in Fig. 3. At this phase of operation the vertically slidable frame 17 bearing the jiggering mechanism will be in its highest position, the dwell surface 28 of cam 18 then contacting with the roller 29 of beam 30, and during this period of dwell, the jiggering cams 64, which may be adjusted and timed on shaft 20, act to raise the spindles and chucks and the friction gears 144 and 145 rotate same, the chucks elevating the molds from the racks 72 resting on supports 114 into coaction with the profiles 70 substantially as described in my copending application hereinbefore noted, then lowering the molds onto the racks 72 after the charges have been formed or jiggered.

The dwell surface 28 of said cam 18 then moves off of the roller 29 and the frame 17 bearing the jiggering mechanism including the profiles 70 lowers to its lowermost position, this movement imparting a stroke to the bell crank levers 76—77 and pawls 84, which in turn move the loaded truck into position on tracks 74 and move the empty truck in front thereof a step towards the rear transverse conveyor 62, and also move the trucks on tracks 75 a step forward, bringing an empty tier of shelves or an empty truck in position on said latter tracks to receive the rack 72 from the jiggering mechanism.

The lowered, vertically slidable frame 17 carries therewith the rack 72 on the supports 114 bearing molds with jiggered charges, and the face cam 90 may be adjusted and timed on shaft 20 to permit the rocker arm 102 to impart a stroke to the push rod 107, which slides a mold rack from the lower shelf 123 of the truck 63 on tracks 74 into abutting engagement with the rack on the supports 114, sliding said latter rack over onto the lower shelf 123 of the empty truck 63 on tracks 75 and providing said supports over the jiggering mechanism with a rack bearing molds having charges ready for the jiggering operation.

The dwell surface 26 of cam 18 is then contacting with roller 29 and the frame 17 remains stationary in its lowest position while the jiggering operation is repeated.

The cam 18, through the connections heretofore described, then raises the frame 17 to the intermediate position herein shown and the face cam 90 on shaft 20 permits another stroke of push rod 107, which slides a rack from the second shelf of the truck 63 on tracks 74 onto supports 114 and pushes the rack then on the supports 114 onto the second shelf of the truck on tracks 75.

The dwell surface 27 of cam 18 is then contacting with roller 29 and the frame 17 remains stationary while the jiggering operation is again performed.

The cam 18 then raises the frame 17 to its highest position and the rack 72 on the supports 114 is shifted onto the top shelf of the truck on tracks 75 and replaced by a rack from the top shelf of the truck on tracks 74 by face cam 90 and push rod 107, and the jiggering operation again takes place while the dwell surface 28 of cam 18 contacts with roller 29, after which the frame 17 drops to its lowermost position and the trucks are again moved a step forward by pawls 84 on tracks 74 and tracks 75.

It will be seen that the face cam 90 permits three strokes of the push rod 107 to one stroke of the pawls 84, the latter resulting from the dropping of frame 17.

As the empty trucks on track 74 are intermittently moved toward the intermittently actuated transverse conveyor 62, they roll thereon, and the intermittent gear 49 may be timed relatively to the jiggering mechanism to move the conveyor a step transversely to each three strokes of pawls 84, the trucks automatically disengaging from each other when leaving tracks 74 and engaging upon reaching tracks 75, and then moving into position opposite the jiggering mechanism on tracks 75 to receive racks 70 bearing molds with the jiggered or formed charges thereon. The tracks 74 and 75 may lead into a drier and the shaft 55 be extended to the far end of the drier and there provided with a conveyor or transferring mechanism similar to that shown in Fig. 3 but geared to reverse the direction of travel of the conveyor to transfer the trucks from tracks 75 to tracks 74.

It will also be understood that the jiggering or other operation may be performed while the frame 17 is moving vertically and employ the periods of dwell of the frame 17 to shift the racks horizontally while in alinement with their respective shelves, to thereby eliminate lost time and speed up the the operation. When the mechanism is used for jiggering, I prefer to supply the molds with charges of material just prior to the jiggering operation after being pushed off the trucks on track 74, as heretofore specified.

Many other changes may be made in the details of my mold loading and transferring machine and jigger combined without departing from the main scope of my invention, and parts of my invention may be used without other parts. I do not, therefore, restrict myself to the details as shown in the drawings, but I intend to include also all mechanical equivalents and obvious modifications of the same within the scope of my invention.

I claim as my invention and desire to secure by Letters Patent:

1. In a machine of the class specified, a main stationary frame, jiggering mechanism movably supported on said frame, means for supporting molds in multiple levels, means for periodically moving the jiggering mechanism adjacent each level, and means for successively moving the molds of each level into operative adjacency to said jiggering mechanism.

2. In a machine of the class specified, a main stationary supporting frame, mechanism slidable as a unit on said frame, means for supporting molds in multiple tiers, means for elevating said mechanism step-by-step adjacent each tier, and means for successively moving the molds of each tier into operative coaction with said mechanism.

3. In a machine of the class specified, a main stationary supporting frame, a supplemental frame slidably mounted on said main frame, jiggering mechanism carried by said supplemental frame, means for supporting molds in multiple levels adjacent said supplemental frame, and means for automatically successively bringing said latter frame and jiggering mechanism in operative adjacency to the molds of each level.

4. In a machine of the class specified, a main stationary supporting frame, a supplemental frame shiftably mounted on said main frame, operating mechanism carried by said supplemental frame, means for supporting material to be operated upon in multiple tiers adjacent said supplemental frame, and means for automatically successively bringing said latter frame and mechanism in operative adjacency to the material of each tier.

5. In a machine of the class specified, a main stationary supporting frame, a supplemental frame shiftably mounted on said main frame, jiggering mechanism carried by said supplemental frame, means for supporting molds in multiple tiers adjacent said supplemental frame, and a cam for periodically actuating said latter frame to bring said jiggering mechanism in operative adjacency to the molds of each tier.

6. In a machine of the class specified, a main stationary supporting frame, a supplemental frame movably mounted on said main frame, jiggering mechanism carried by said supplemental frame, means for supporting molds in tiers adjacent said supplemental frame, and a cam having thereon multiple dwell surfaces for periodically elevating and maintaining the supplemental frame and jiggering mechanism operatively stationary within operative adjacency to the molds of each tier.

7. In a machine of the class specified, a main stationary supporting frame, a supplemental frame slidably mounted on said main frame, jiggering mechanism carried by said supplemental frame, means for supporting molds in tiers adjacent said supplemental frame, and a cam for actuating said supplemental frame and jiggering mechanism, said cam being provided with multiple dwell surfaces arranged at successively greater distances from the axis of the cam.

8. In a machine of the class specified, a main stationary supporting frame, jiggering mechanism slidable vertically as a unit on said frame, means for supporting molds in tiers on opposite sides of said jiggering mechanism, means for periodically elevating said jiggering mechanism in operative adjacency to the molds of each tier, and means for transferring the molds from one tier to the jiggering mechanism and subsequently to the opposite tier.

9. In a machine of the class specified, a main stationary supporting frame, a supplemental frame provided with mold rack supports slidably mounted on said main frame, jiggering mechanism carried by said supplemental frame, mold racks arranged in tiers on opposite sides of the supplemental frame, intermittently operating means for transferring said mold racks from said tiers to said supports and subsequently to the opposite tiers, and means for intermittently actuating said frame and jiggering mechanism in timed relation to said transferring means.

10. In a machine of the class specified, a main stationary frame, a supplemental frame provided with mold rack supports and slidably mounted on said main frame, jiggering mechanism carried by said supplemental frame, mold racks arranged on shelves on opposite sides of the supplemental frame and jiggering mechanism, means for elevating said latter frame and mechanism step-by-step adjacent said shelves, intermittently operating means for transferring said mold racks from said shelves to said supports and subsequently to the opposite shelves, and means for intermittently advancing said shelves.

11. In a machine as claimed in claim 10, wherein the intermittently operating means for transferring said mold racks includes a cam adjustable to time the operation of said means with the operation of said jiggering mechanism.

12. In a machine of the class specified, a main stationary supporting frame, a supplemental frame provided with mold rack supports and slidably mounted on said main frame, jiggering mechanism carried by said supplemental frame, mold racks arranged on shelves on opposite sides of the jiggering mechanism, a cam for elevating said supplemental frame and jiggering mechanism step-by-step adjacent said shelves, intermittently operating means for transferring said mold racks from said shelves to said supports and subsequently to the opposite shelves, means for periodically advancing said shelves in a direction transverse to the plane of transfer of said mold racks, and means for synchronizing the operation of said elevating cam, mold rack transferring means and shelf-advancing means.

13. In a machine of the class specified, a main stationary supporting frame, a supplemental frame provided with mold rack guiding and supporting means and slidably mounted on said main frame, jiggering mechanism carried by said supplemental frame, carriers provided with a plurality of tiers carrying mold racks and moving on tracks on opposite sides of said supplemental frame and jiggering mechanism, means for elevating said supplemental frame and jiggering mechanism step-by-step adjacent said tiers and lowering said frame and mechanism in one continuous movement, intermittently operating means for successively shifting said mold racks from the tiers of one carrier onto said mold rack supporting and guiding means and subsequently onto the tiers of the opposite carrier, and means operable through the lowering movement of the supplemental frame and jiggering mechanism for advancing said carriers.

14. In a machine of the class specified, a main stationary supporting frame, a supplemental frame slidably mounted on said main frame and provided with mold rack supports, jiggering mechanism carried by said supplemental frame, trucks moving on tracks on opposite sides of said supplemental frame and jiggering mechanism, a plurality of shelves on said trucks, mold racks on said shelves, means for elevating said supplemental frame and jiggering mechanism step-by-step adjacent said shelves and maintaining said frame and mechanism operatively stationary at each step, and means for successively shifting said mold racks from the shelves of one truck onto said supports and subsequently onto the shelves of the opposite truck, said latter means including a cam and levers adjustable to operate in timed relation to the jiggering mechanism and a means for adjusting the position of said racks while on said supports.

15. In a machine of the class specified, a main stationary supporting frame, a supplemental frame slidably mounted on said main frame and provided with mold rack supports, jiggering mechanism carried by said supplemental frame, trucks provided with a plurality of shelves carrying mold racks and moving on tracks on opposite sides of said supplemental frame and jiggering mechanism, means for elevating said supplemental frame and jiggering mechanism step-by-step adjacent said shelves and lowering said frame and mechanism in one continuous movement, intermittently operating means for successively shifting said mold racks from the shelves of one truck onto said supports and subsequently onto the shelves of the opposite truck, means for periodically advancing said trucks on said tracks, and means for transferring said trucks from one track to the other.

16. In a machine of the class specified, a main stationary supporting frame, a supplemental frame slidably mounted on said main frame and provided with mold rack supports, jiggering mechanism carried by said supplemental frame, trucks provided with a plurality of shelves and moving on tracks on opposite sides of said supplemental frame and jiggering mechanism, mold racks carrying molds with material to be operated upon arranged on the shelves of the trucks moving on one side of said supplemental frame and jiggering mechanism, a cam for elevating said latter frame and mechanism step-by-step adjacent said shelves and lowering the same in one continuous movement, means operating in timed relation with said elevating cam for successively shifting said mold racks from the shelves of one truck onto said supports and subsequently onto the shelves of the opposite truck, said cam being provided with a plurality of dwell surfaces for periodically maintaining said jiggering mechanism and supports in the horizontal plane of said shelves at each step of elevation while the material of the molds carried by the racks on said supports is being operated upon, means operable through the lowering of said supplemental frame and jiggering mechanism for periodically advancing said trucks on said tracks, and a transverse conveyor for transferring said trucks from one track to the other.

17. A machine as claimed in claim 16, wherein means are provided for synchronizing the operation of said conveyor with the operation of said jiggering mechanism.

18. In a machine of the class specified, a main stationary supporting frame, a supplemental frame slidably mounted on said main frame and provided with mold rack supports, jiggering mechanism carried by said supplemental frame, trucks provided with a plurality of shelves and moving on tracks on opposite sides of said supplemental frame and jiggering mechanism, mold racks carrying molds with material to be operated upon arranged on the shelves of the trucks moving on one side of said supplemental frame and jiggering mechanism, a cam for elevating said latter frame and mechanism step-by-step adjacent said shelves and lowering the same in one continuous movement, means operating in timed relation with said elevating cam for successively shifting said mold racks from the shelves of one truck onto said supports and subsequently onto the shelves of the opposite truck, said cam being provided with a plurality of dwell surfaces for periodically maintaining said jiggering mechanism and supports in the horizontal plane of said shelves at each step of elevation while the material of the molds carried by the racks on said supports is being operated upon, means operable through the lowering of said supplemental frame and jiggering mechanism for periodically advancing said trucks on said tracks, a transverse conveyor for transferring said trucks from one track to the other, and means for synchronizing the operation of said conveyor with the operation of said jiggering mechanism, said means comprising a train of gears including an adjustable intermittent gear.

19. A machine as claimed in claim 16, wherein the means for successively shifting said mold racks comprises one or more push rods, one or more push blocks at the ends of said rods, a means for actuating said rods, and a means for adjusting the position of said blocks on said rods to thereby adjust the position of said racks on said supports.

20. In a machine of the class specified, a main stationary supporting frame, mechanism shiftable as a unit on said frame, means for shifting said mechanism, multiple decked carriers moving on tracks adjacent said mechanism, means for periodically advancing said carriers, a transverse conveyor for transferring said carriers, means for imparting intermittent movement to said conveyor in timed relation to said carrier advancing means, tracks on said conveyor, means for adjusting said latter tracks to intermittently register with said first-named tracks, and coupling means for said carriers adapted to automatically disengage and engage through the transverse movement of said conveyer.

WILLIAM J. MILLER.